United States Patent
Sugar et al.

(10) Patent No.: US 7,020,451 B2
(45) Date of Patent: Mar. 28, 2006

(54) WIDEBAND MULTI-PROTOCOL WIRELESS RADIO TRANSCEIVER SYSTEM

(75) Inventors: Gary L. Sugar, Rockville, MD (US); William R. Seed, N. Potomac, MD (US)

(73) Assignee: Cognio, Inc., Germantown, MD (US)

( * ) Notice: Subject to any disclaimer, the term of this patent is extended or adjusted under 35 U.S.C. 154(b) by 340 days.

(21) Appl. No.: 10/065,934

(22) Filed: Dec. 2, 2002

(65) Prior Publication Data

US 2003/0054788 A1 Mar. 20, 2003

Related U.S. Application Data

(63) Continuation of application No. 09/984,166, filed on Oct. 29, 2001.

(60) Provisional application No. 60/245,468, filed on Nov. 3, 2000.

(51) Int. Cl.
*H04B 1/26* (2006.01)

(52) U.S. Cl. .................. 455/323; 455/319; 455/337

(58) Field of Classification Search ............... 455/69, 455/84, 522, 73, 76, 78, 82, 83, 324, 319, 455/323, 337; 370/311, 321, 336, 347, 252, 370/370, 466, 442; 375/295, 296, 297, 219
See application file for complete search history.

(56) References Cited

U.S. PATENT DOCUMENTS

| | | | |
|---|---|---|---|
| 5,768,268 A | 6/1998 | Kline et al. | 370/330 |
| 5,889,772 A | 3/1999 | Fischer et al. | 370/346 |
| 5,909,463 A | 6/1999 | Johnson et al. | 375/220 |
| 5,923,761 A | 7/1999 | Lodenius | 455/73 |
| 5,937,341 A | 8/1999 | Suominen | 455/324 |
| 6,072,994 A | 6/2000 | Phillips et al. | 455/84 |
| 6,154,641 A * | 11/2000 | Zhang | 455/112 |
| 6,173,189 B1 | 1/2001 | Lockhart | 455/561 |
| 6,229,992 B1 | 5/2001 | McGeehan et al. | 455/78 |
| 6,236,674 B1 | 5/2001 | Morelli et al. | 375/219 |
| 6,278,697 B1 | 8/2001 | Brody et al. | 370/310 |
| 6,370,109 B1 * | 4/2002 | Schwartz et al. | 370/203 |
| 6,400,774 B1 | 6/2002 | Matsuoka et al. | 375/295 |
| 6,400,775 B1 * | 6/2002 | Gourgue et al. | 375/296 |
| 6,526,264 B1 | 2/2003 | Sugar et al. | 455/84 |
| 6,546,261 B1 * | 4/2003 | Cummings | 455/552.1 |
| 6,766,160 B1 * | 7/2004 | Lemilainen et al. | 455/411 |
| 2001/0010689 A1 | 8/2001 | Awater et al. | 370/344 |

FOREIGN PATENT DOCUMENTS

| | | |
|---|---|---|
| WO | WO0124455 A1 | 4/2001 |
| WO | WO0124456 A1 | 4/2001 |
| WO | WO0124457 A1 | 4/2001 |

(Continued)

OTHER PUBLICATIONS

TrueRadio, "Enabling WI-FI and Bluetooth Coexistence without Comprise," Mobilian True Connectivity.

*Primary Examiner*—Sonny Trinh
*Assistant Examiner*—Sam Bhattacharya
(74) *Attorney, Agent, or Firm*—Edell, Shapiro, & Finnan

(57) ABSTRACT

A wideband radio transceiver system that features a wideband RF section and a flexible and scalable baseband signal processing section. The transceiver system architecture has configurable baseband processing to process signals for multiple communication protocol standards, or multiple instances of the same communication protocol standard, that operate over the same frequency band. Optional additional features include a transmit carrier suppressor and transmit interference canceller to suppress the effects of a transmit signal on receive signal processing when signals are being transmitted and received simultaneously.

4 Claims, 6 Drawing Sheets

FOREIGN PATENT DOCUMENTS

| WO | WO0124458 A1 | 4/2001 |
| WO | WO0124454 A1 | 5/2001 |
| WO | WO0135540 A2 | 5/2001 |
| WO | WO0135578 A1 | 5/2001 |

* cited by examiner

WIDEBAND MULTI-PROTOCOL WIRELESS RADIO TRANSCEIVER SYSTEM

CROSS REFERENCE TO RELATED APPLICATIONS

This application is a continuation of U.S. application Ser. No. 09/984,166, filed Oct. 29, 2001, pending, which in turn is a non-provisional application of U.S. Provisional Application No. 60/245,468, filed Nov. 3, 2000. The entirety of both the aforementioned parent non-provisional application and the provisional application are incorporated herein by reference.

BACKGROUND OF INVENTION

The present invention is directed to a radio transceiver system architecture useful in communication devices operating in a wireless local area network (WLAN) and/or a wireless personal area network (WPAN). The term WLAN is used to refer to a class of wireless communication technology that operates at a distance up to 100 meters, and WPAN is commonly used to refer to a class of wireless communication technology that operates up to a distance of 10 meters. For simplicity, when used herein, the term WLAN is meant to encompass WLAN as well as WPAN technologies, and any other shorter-range wireless communication technology, particularly, but not limited to, those that do not require a license for operation by the Federal Communications Commission in the United States and other similar unlicensed bands outside of the U.S.

Generally, the unlicensed bands are at 2.4 GHz and 5 GHz. The 5 GHz unlicensed band consists of band segments that are not contiguous, whereas the 2.4 GHz unlicensed band is a single contiguous frequency band. As shown in the chart below, certain applications are served in particular unlicensed bands, depending on the application. Moreover, certain wireless communication technologies are used in the various bands.

Conventional practice is to design a radio transceiver targeted to the point solutions they are to be used in. For example, a radio transceiver to be used in a device that operates using the Bluetooth™ communication protocol is sized and customized to the Bluetooth protocol. Generally the same can be said for radio transceivers designed for use in devices that operate using the IEEE 802.11 communication protocol. However, there is a trend in which many applications of WLANs require that a communication device operate multiple communication protocol technologies, or operate multiple instances of the same communication protocol technology. For example, a computer laptop device may operate both 802.11 and Bluetooth.

| Wireless Technology | Primary Markets | Max Data Rate | Range (feet) | ISM Band (GHz) | Modulation |
|---|---|---|---|---|---|
| 802.11/DS | Enterprise, School | 2 Mbps | 150 | 2.4 | DS/QPSK |
| 802.11/FH | Enterprise, School | 2 Mbps | 150 | 2.4 | FH/FSK |
| 802.11b | Enterprise, School, Public Access | 11 Mbps | 150 | 2.4 | DS/CCK |
| 802.11a | Enterprise, School, Public Access | 54 Mbps | 75 | 5 | OFDM/QAM/PSK |
| OpenAir | Enterprise, School | 1.6 Mbps | 500 | 2.4 | FH |
| HiperLAN1 | Enterprise, School, Public Access | 24 Mbps | 150 | 5 | OFDM |
| HiperLAN2 | Enterprise, School, Public Access | 54 Mbps | 75 | 5 | OFDM/QAM/PSK |
| Bluetooth | Wireless cable, Handsets, HandHelds | 721 kbps | 30 | 2.4 | FH/FSK |
| HomeRF | Home | 1.6 Mbps | 150 | 2.4 | FH/FSK |
| HomeRFWB | Home, School | 10 Mbps | 150 | 2.4 | FH/FSK |

Consequently, it is desirable to provide a radio transceiver system architecture that can be used for one or more communication protocol technologies in a flexible and scalable manner.

SUMMARY OF INVENTION

The present invention is directed to a wideband transceiver system architecture that features a shared radio frequency (RF) hardware section and a scalable baseband signal processing section. Baseband signal processing may be implemented with hardware, a digital signal processor (DSP), a field-programmable gate array (FPGA) or one or more application specific ICs (ASICs) allowing it to be readily configurable for different communication protocol standards. A radio architecture with configurable baseband processing allows multiple standards that operate over the same frequency band to share the same radio hardware implementation. A new standard can be supported by implementing the required additional firmware functionality in the baseband processing sections.

A configurable radio approach to the implementation of multiple technologies that share a common frequency band enables a lower cost solution by reducing the number of integrated circuits and additional filters and other passive components that would otherwise be required for implementations that use multiple separate chipsets for each technology. The implementation of the present invention enables chipset developers to benefit from IC cost reductions associated with reductions in digital CMOS IC geometry.

Other objects and advantages of the present invention will become more readily apparent when reference is made to the following description in conjunction with the accompanying drawings.

DETAILED DESCRIPTION

Figure 1:
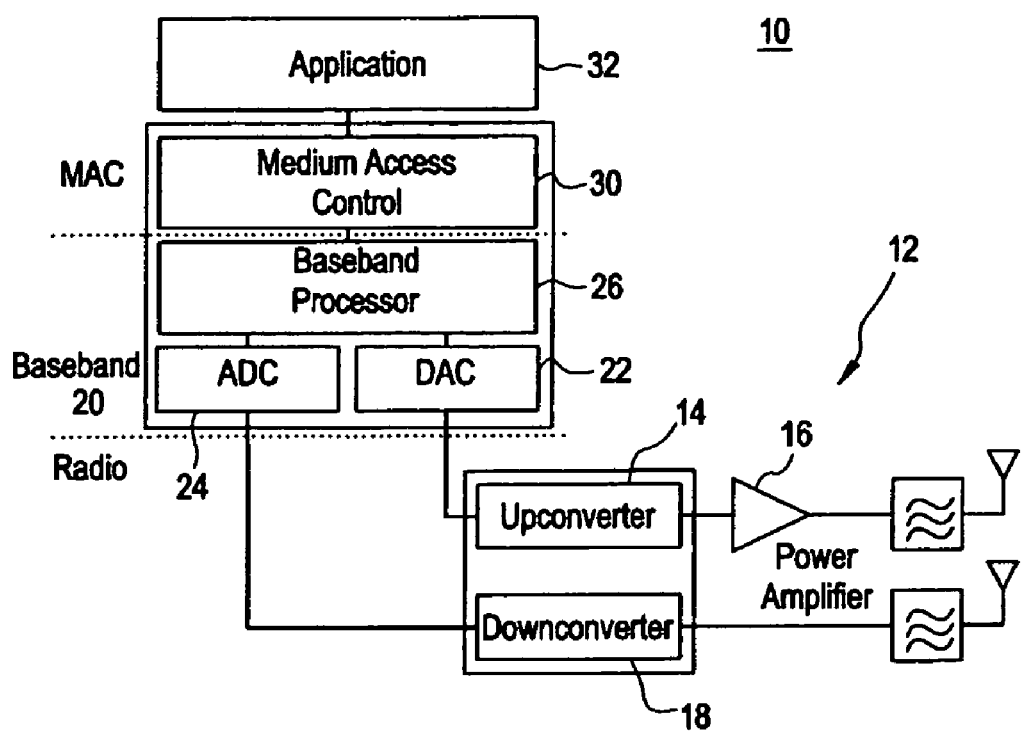
FIG. 1 is a block diagram of a wideband transceiver system architecture according to the present invention.

A general diagram of the wideband transceiver 10 is shown in FIG. 1. The RF hardware 12 consists of a generic upconverter 14 that converts a baseband or low intermediate frequency (IF) signal to the transmit frequency band, a power amplifier (PA) 16 which amplifies the upconverted signal to a desired output level, and a generic downconverter 18 which converts the received RF signal to baseband or a low IF. A baseband processing section 20 includes a digital-to-analog converter 22 for analog conversion of the transmit signal, an analog-to-digital converter 24 for digitizing the received baseband or low IF signal, and configurable baseband processing firmware 26.

The baseband signal processing section 20 may be implemented with configurable firmware or software (e.g., a DSP, FPGA or other programming processor) which enables chipset developers to more rapidly implement new features of existing standards. This is frequently referred to in the art as a "software" radio. For example, consider the case of a standard that incorporates a new physical layer implementation in the same frequency band. No changes are required to the RF hardware; the new feature is supported by providing additional firmware in the baseband processing section. The baseband processing section 20 is coupled to a medium access control (MAC) section or layer 30, which in turn couples to an application section or layer 32.

The RF hardware is capable of processing signals over the entire band of operation, thereby enabling chipset scalability. For example, multiple channels of a similar technology may be supported by enhancing only the baseband processing firmware. Similarly, different technologies that share the same frequency band may be supported through enhancement of the same baseband processing firmware. Such an approach is significantly less expensive in terms of cost and development time than having to replicate the entire baseband processing and RF hardware blocks for each additional channel and/or technology to be supported.

Figure 2:
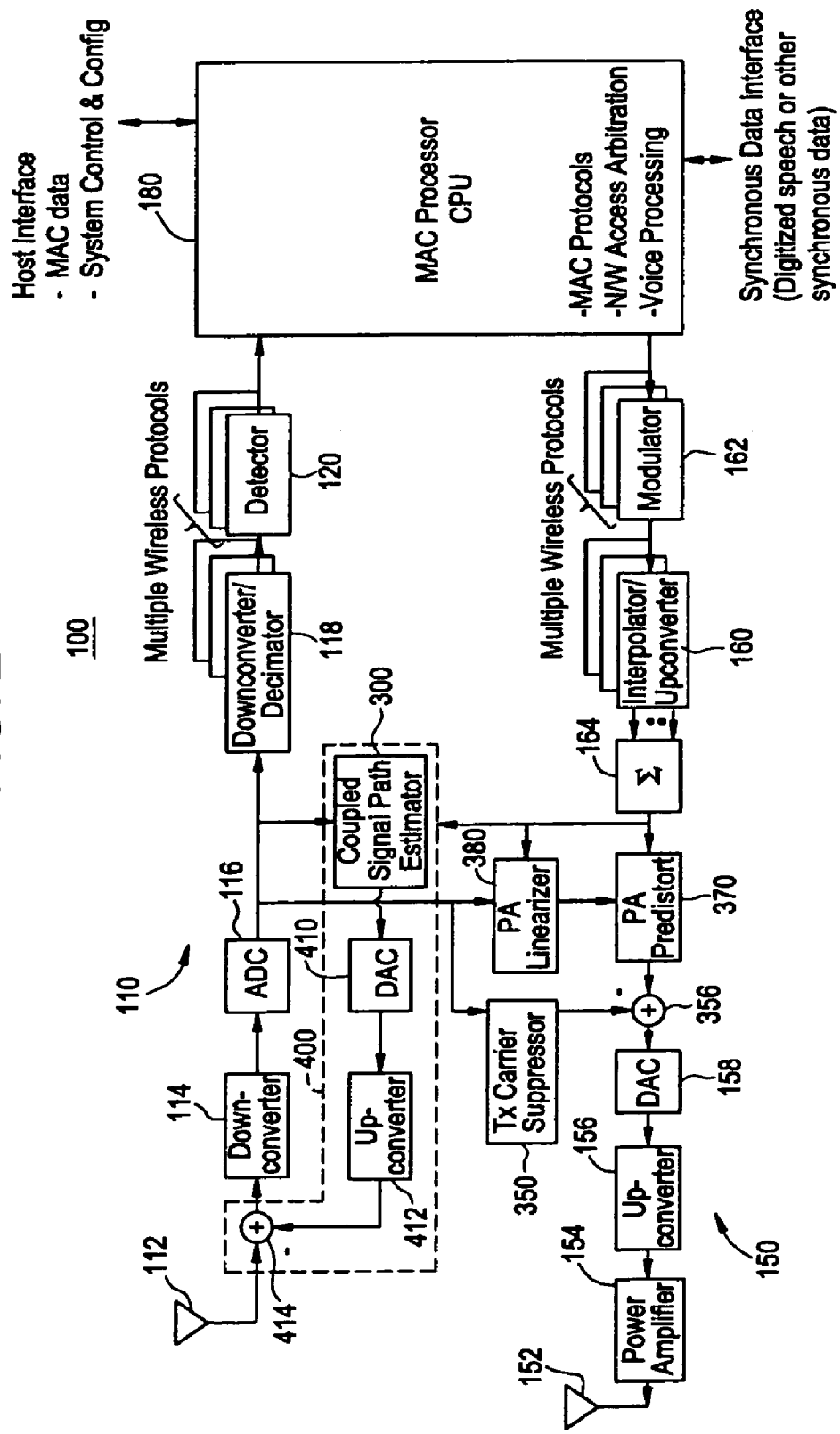
FIG. 2 is a detailed block diagram of a wideband transceiver system according to one embodiment of the present invention.
Figure 3:
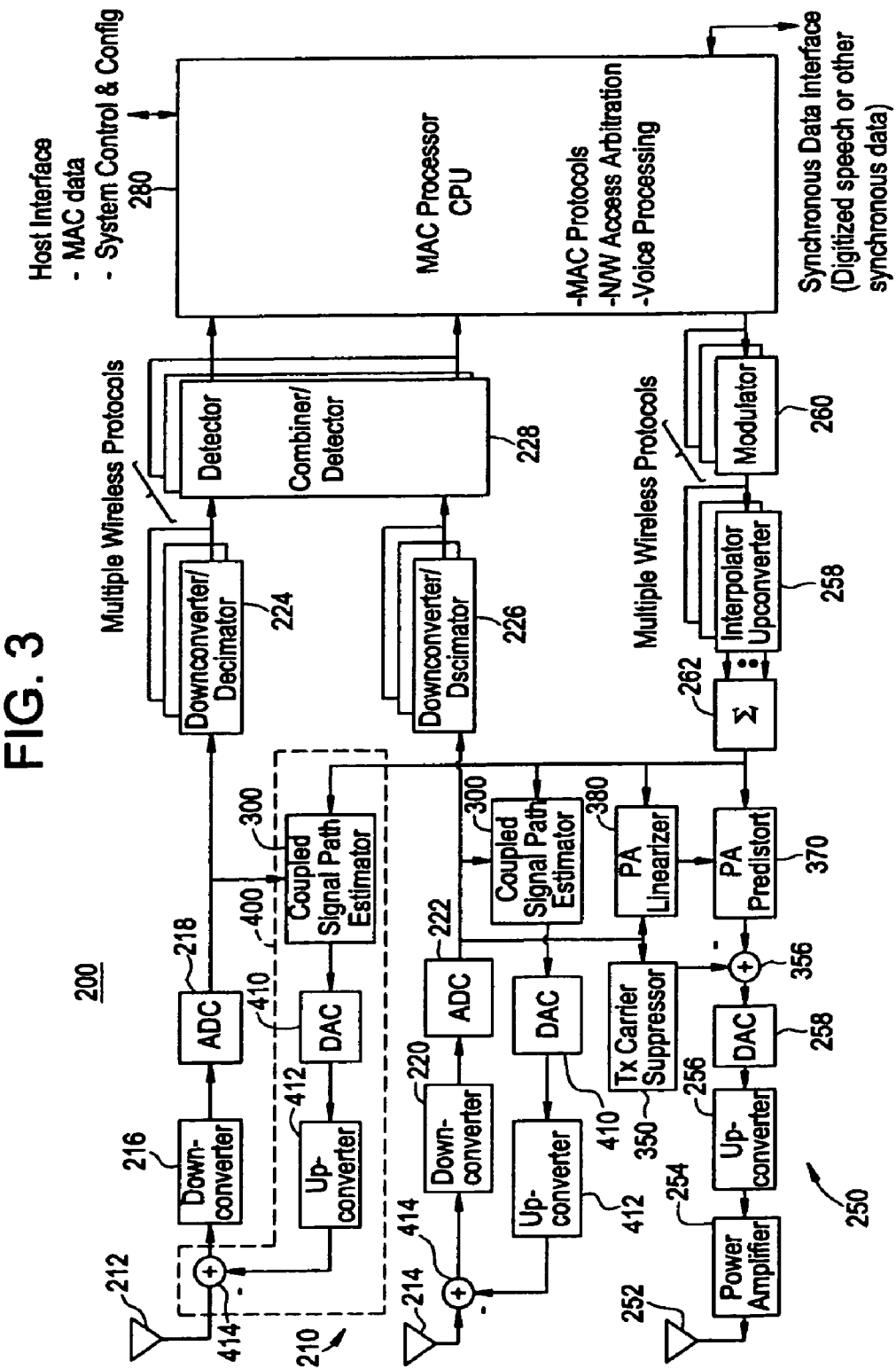
FIG. 3 is a detailed block diagram of a wideband transceiver system according to another embodiment of the present invention.

A block diagram of the wideband radio transceiver system architecture using a single receive antenna is shown in FIG. 2. A dual-receive antenna embodiment is shown in FIG. 3. The following describes how the wideband architecture is used to process multiple WLAN protocols such as Bluetooth, HomeRF and IEEE 802.11 in the 2.4 GHz ISM band.

These techniques are discussed in the context of a particular set of protocols operating over a particular frequency band; however, the techniques described in this section may be applied more broadly to process communication protocol signals over other frequency bands. There are several independently unique features of the wideband architecture described herein as will become apparent from the description with reference to the diagrams.

The wideband radio transceiver system architecture of FIG. 2 is first described. The system, generally identified by reference numeral 100, comprises a receive signal path 110 and a transmit signal path 150. The receive signal path 110 comprises a receive antenna 112, a downconverter 114, an analog-to-digital converter (ADC) 116, a downconverter/decimator bank 118 and detector bank 120. The number and type of downconverter/decimators in the downconverter/decimator bank 118 and of the detectors in the detector bank 120 depends on the number and type of communication protocols that the radio system 100 implements. There is a downconverter, a decimator and a detector for each communication protocol because each protocol may require unique downconversion, data rates and detection schemes. The outputs of the detector bank 120 are coupled to a MAC processor/CPU 180. The MAC processor/CPU 180 performs all of the necessary MAC protocol processing, voice (synchronous data) processing, network access arbitration, etc. The MAC processor/CPU 180 interfaces with a host device to exchange MAC data and system control and configuration data, and interfaces with a synchronous data interface to exchange digitized voice or other synchronous data, such as music or video. The MAC processor/CPU 180 may also act as the control processor for the receive signal path section and transmit signal path section, such as providing control signals to the interpolator/upconverter bank in the transmit signal path section to deal with the frequency hopping nature of a communication protocol, as well as for processing information used in optional enhancement functions described hereinafter in conjunction with FIG. 6.

The transmit signal path 150 comprises a transmit antenna 152, a power amplifier 154, an upconverter 156, a digital-to-analog converter (DAC) 158, an interpolator/upconverter bank 160 and a modulator bank 162. The number and type of interpolators and upconverters in the interpolator/upconverter bank 160 and modulators in the modulator block 162 depends on the number and type of communication protocols that the radio system 100 implements, as explained above for the downconverter/decimator bank 118 and detector bank 120. Again, each protocol may require unique interpolation, upconversion and modulation. The outputs of each of the interpolators/upconverter 160 are added together by a summer 164.

Referring to FIG. 3, the wideband radio transceiver system architecture is identified by reference numeral 200. The radio system architecture 200 is a dual-receive antenna architecture comprising a dual signal receive path 210 and a transmit signal path 250. The dual signal receive path 210 comprises a first receive antenna 212 and a second receive antenna 214 associated with first and second receive signal paths. The receive antennas 212 and 214 are physically separated to enable the benefits of spatial diversity under Rayleigh fading conditions to be achieved, which is equivalent to minimizing the correlation between the receive signals. Associated with the first receive antenna 212 is a downconverter 216 and an ADC 218, and associated with the second receive antenna 214 is a downconverter 220 and an ADC 222. The ADC 218 is coupled to a first downconverter/decimator bank 224 and the ADC 222 is coupled to a second downconverter/decimator bank 226. The downconverters/decimators in bank 224 are the same as those in bank 226; they operate on the signals received by the different receive antennas. A combiner/detector bank 228 comprising a plurality of combiners and detectors is coupled to the first and second downconverter/decimator blocks 224 and 226.

The transmit signal path 250 comprises a transmit antenna 252, an upconverter 254, a DAC 256, a plurality of interpolators/upconverters 258 and a plurality of modulators 260. The output of the interpolators/upconverters 258 is added by a summer 262. The MAC processor/CPU 280 is similar to the MAC processor/CPU 180 shown in FIG. 2.

To maximize isolation between the transmit and receive signal paths, the transmit antenna and receive antenna(s) in the system architectures of FIGS. 2 and 3 are sufficiently spatially separated by a distance (relative to the wavelengths of signals in the frequency band) sufficient to achieve attenuation/suppression of the transmit signal in the receive signal path (particularly when the transceiver is transmitting and receiving signals at the same time). Providing this separation reduces the required dynamic range of the receiver. Polarization of the respective transmit and receive antennas also helps to suppress the transmit signal coupled to the receive signal path.

In FIGS. 2 and 3, there are additional optional elements that have not yet been referenced. There is a coupled signal path estimator 300, a transmit carrier suppressor 350, a power amplifier (PA) predistorter 370 and a PA linearizer 380. The coupled signal path estimator 300 is part of a transmit interference canceller 400 that comprises a DAC 410, upconverter 412 and an adder 414. The function of these elements will be described hereinafter. Also, FIGS. 2 and 3 show certain elements as being combined together, such as the downconverter/decimator bank 118; however, these elements may be separate, such as a downconverter bank and a decimator bank.

The wideband radio transceiver system architectures shown in FIGS. 2 and 3 employ a predominantly digital software/firmware implementation. That is, the RF hardware, such as the adder 414, downconverter 114 (downconverter 216), upconverter 412, power amplifier 154 (power amplifier 254), upconverter 156 (upconverter 256) are implemented with analog RF hardware designs, but are designed to operate over the entire frequency band of operation, thereby enabling chipset scalability. The remaining elements are implemented using one or more digital application specific and/or general purpose CPUs or processors, that reside on or more physical chips, that execute firmware or software, respectively, to process signals as required by each communication protocol.

An advantage of the system architectures shown in FIGS. 2 and 3 is that a particular wireless communication device can easily be customized or modified to handle a particular set of communication protocols or standards. The software or firmware for the desired communication protocol is incorporated into the downconverter/decimator bank and detector bank in the receive signal path section, and likewise in the interpolator/upconverter bank and modulator bank in the transmit signal path section. Again, this provides great scalability and flexibility to the design and deployment of communication devices having multiple protocol capability. Thus, significant components of the radio transceiver system may be embodied as a software product stored on a processor readable memory containing instructions that, when executed by a processor, causes the processor to perform the various processing steps required.

Figure 4:
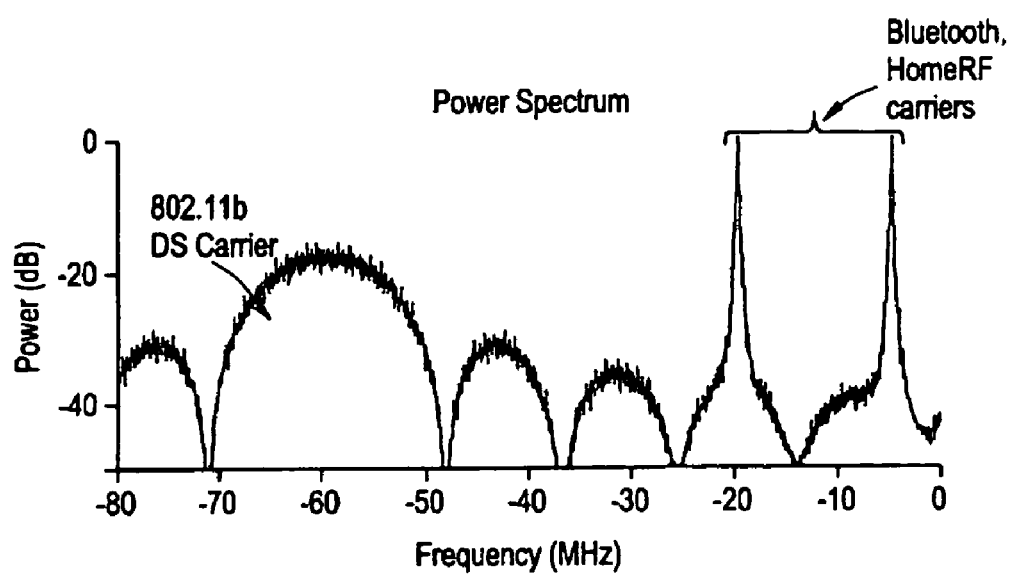
FIG. 4 is a graphical diagram showing an example of the spectrum of the frequency band that is processed by the wideband transceiver system according to the present invention.

FIG. 4 shows an example of the spectrum over a brief interval of time at the ADC input and DAC outputs for 802.11b, Bluetooth and HomeRF signals. In this example, there is a 802.11 signal centered at 60 MHz, a Bluetooth signal centered at 20 MHz and a HomeRF signal centered at 5 MHz.

The basic operation of the radio systems shown in FIGS. 2 and 3 will be described.

The signal from the receive antenna path is downconverted to an appropriate receive IF, filtered to remove signals outside the ISM band, and then digitized using a high-speed analog-to-digital converter. In the system of FIG. 2, this involves the receive antenna 112, the downconverter 114 and the ADC 116. In the radio system of FIG. 3, this involves the signals from each of the receive antennas 212 and 214, one of which is processed by the downconverter 218 and ADC 218, and another of which is processed by downconverter 220 and ADC 222. In one embodiment of this system, the downconverter used is a zero-IF quadrature downconverter followed by a lowpass filter. The ADC is, for example, a dual-channel ADC generating at least 80 million complex samples per second in order to prevent aliasing when digitizing the 80 MHz ISM band. In another embodiment, the downconverter performs real signal downconversion to an IF of at least 40 MHz and the ADC is a single-channel ADC operating at a sampling rate of at least 160 MHz.

Prior to downconversion, the optional transmit interference canceller 370 may be used to subtract a replica of the transmit signal from the receive signal path in order to minimize the dynamic range required of the receiver. A more detailed description of the transmit interference canceller is provided hereinafter in conjunction with FIG. 6.

The ADC output signal is fed into the downconverter/decimator bank which converts each of the desired receive signals (associated with one or more communication protocols) in the sampled band to its complex baseband representation. In the downconverter/decimator bank, the baseband signal is lowpass filtered to remove out-of-band energy, and decimated to a convenient sampling rate for a corresponding communication protocol. For frequency-hopped modulation schemes such as Bluetooth and HomeRF, the operating frequency of the digital downconverter is updated periodically to coincide with changes to the carrier frequency. The hop frequency update rate for Bluetooth is 1600 Hz and for HomeRF the update rate is 50 Hz. In FIG. 2, this involves the downconverter/decimator bank 118, and in FIG. 3, this involves the downconverter/decimator bank 224 and downconverter/decimator bank 226, that operate on signals from the receive paths of antennas 212 and 214, respectively.

The decimated baseband signals are provided as an input to a bank of detectors that demodulate the receive signals and recover corresponding data. In FIG. 2, this involves the detector bank 120. For Bluetooth and HomeRF signals, for example, the detector is a complex FM discriminator followed by a two or four-level slicer. For 11 Mbps 802.11b signals, the detector may be a RAKE receiver followed by an array of complimentary code keying (CCK) decorrelators, and optionally by a Viterbi decoder if convolutional coding is enabled.

Figure 5:
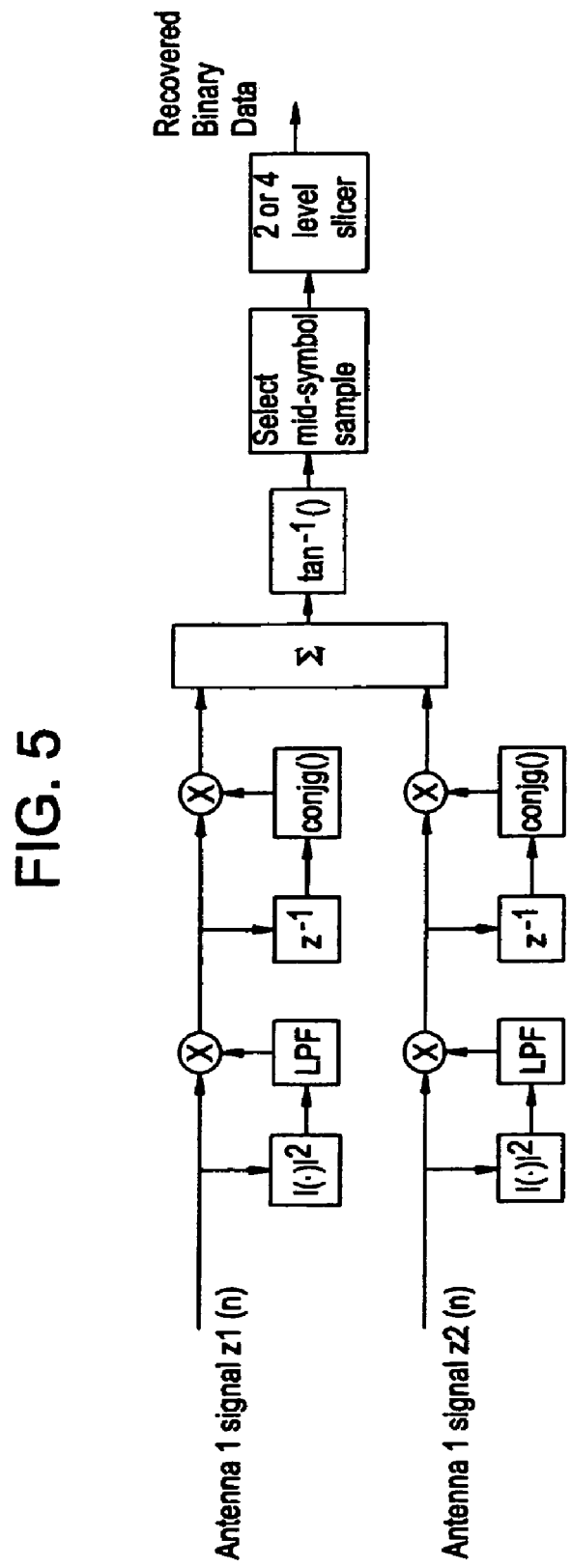
FIG. 5 is a block diagram of an exemplary detector useful for frequency hopping communication protocol signals.

In the two-path diversity system shown in FIG. 3, a joint combiner/detector bank 228 combines the two signals from each antenna path to recover the transmitted data. The combiner/detector used for Bluetooth and HomeRF, for example, is a differentially-coherent maximal-ratio combiner/FM discriminator as shown in FIG. 5, followed by a two or four-level slicer. The 802.11b combiner/detector uses a 2-path RAKE receiver to co-phase, weight and sum the fingers from both receive antennas. The combined signal is then provided as an input to a CCK decorrelator. The recovered receive data is passed from the detector to the CPU for further processing at the MAC layer. Other implementations for the detectors for particular communication protocols are well known in the art.

When transmitting information, data from the MAC processor/CPU is fed into a bank of baseband modulators (one for each time/frequency channel of each supported protocol) which maps the data onto complex baseband signals using the appropriate modulation protocols. In the system of FIG. 2, this involves the modulator bank 162, and in the system of FIG. 3, this involves the modulator bank 260. For Bluetooth and HomeRF, for example, the modulator is a gaussian lowpass filter followed by a complex FM modulator running at sampling rates of 8 and 6.4 MHz, respectively. For 11 Mbps 802.11b DS, the data is mapped onto complex QPSK symbols using CCK, and then square-root raised cosine lowpass filtered at a sampling rate of 44 MHz. Other implementations for the modulators for particular communication protocols are well known in the art.

The modulator outputs are fed into a bank of interpolators that increase the sampling rates of the modulated baseband waveforms to that of the transmit DAC. The interpolator outputs are then upconverted to an appropriate IF frequency at the desired offset position within the ISM band. This involves the interpolator/upconverter bank 160 in the system of FIG. 2 and the interpolator/upconverter bank 258 in the system of FIG. 3. In one embodiment of this system which covers an 80 MHz frequency band, complex upconversion is used with a 0 Hz IF, followed by a dual-channel transmit DAC generating at least 320 million complex samples per second. Another embodiment uses quadrature upconversion, a transmit IF of at least 40 MHz, and a single-channel transmit DAC running at a sampling rate of at least 160 MHz, for the same 80 MHz frequency band.

The outputs from each of the upconverters is summed by the summer 164 and applied to an optional PA linearizer and PA predistortion process in order to compensate for non-linear distortion generated by the PA. A more detailed discussion of the PA linearization process is described hereinafter. If linearization is employed, the pre-distorted output samples are fed to the transmit DAC, the output of which is subsequently lowpass filtered to remove harmonics of the sampling clock, upconverted to RF, amplified using a PA, and delivered to the transmit antenna. This involves the DAC 158, upconverter 156 and PA 154 in the system of FIG. 2, and the DAC 258, upconverter 256 and PA 254 in the system of FIG. 3.

Figure 6:
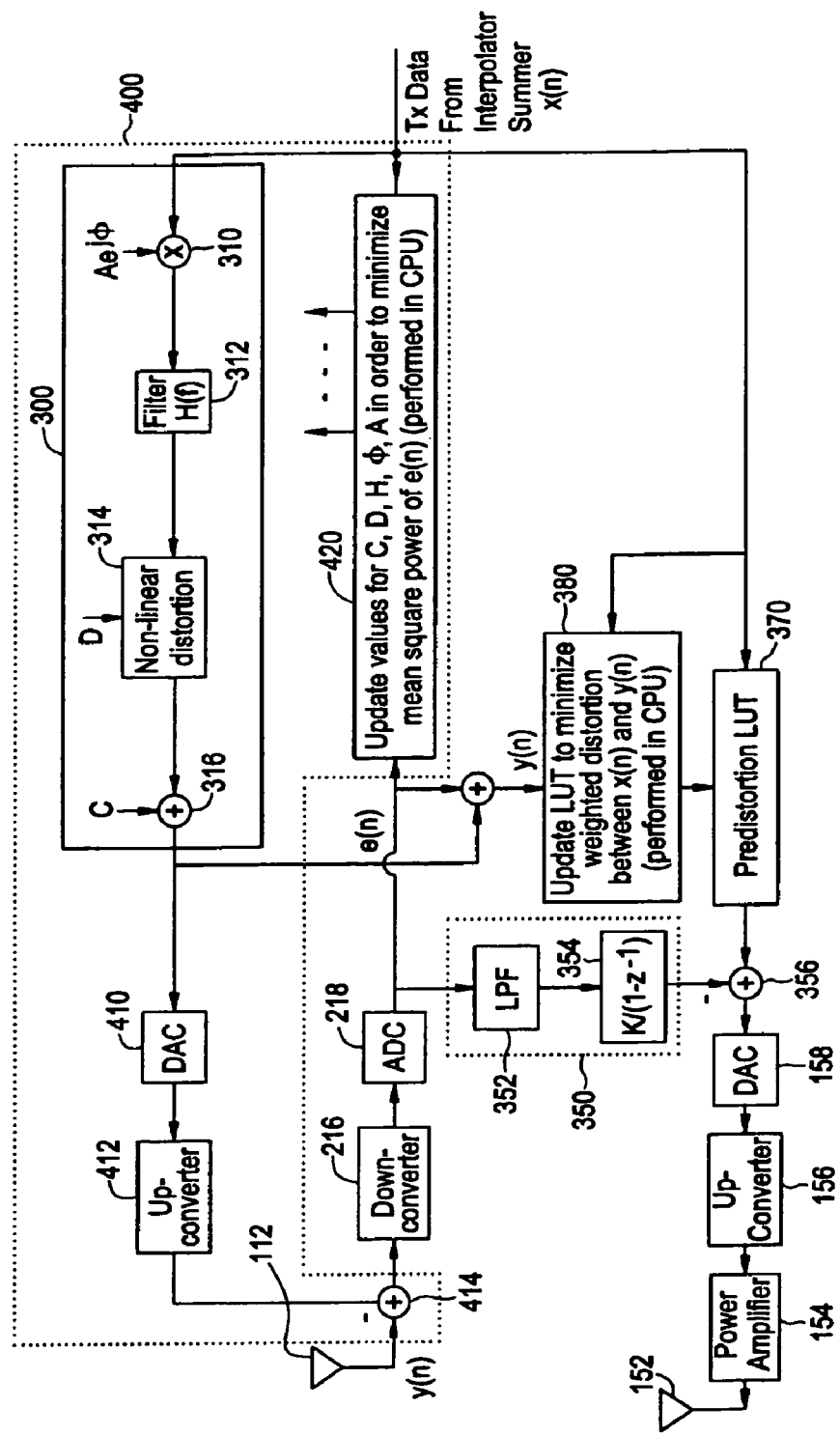
FIG. 6 is a block diagram showing a transmit interference canceller, power amplifier predistorter and other specific features useful in a wideband transceiver.

Turning to FIG. 6, several optional enhancements to the wideband systems will be described. First, the transmit carrier suppressor 350 is shown coupled between the output of the ADC 218 in the receiver signal path and the DAC 218 in the transmit signal path. (The transmit carrier suppressor 350 is useful in the system of FIG. 3 as shown, but parts of the configuration of FIG. 2 are used in FIG. 6 simply for purposes of explanation.) The transmit carrier suppressor 350 comprises a lowpass filter (LPF) 352 and an accumulator 354. The transmit carrier suppressor minimizes the carrier leakage caused by both DC offset in the transmit DAC and imperfections in the transmit upconverter. In operation, whenever the transmit PA is enabled, the signal received from the ADC in the receive antenna path is lowpass filtered by the LPF 352 and applied to the accumulator 354. The accumulator 354 has a large time constant relative to a packet duration. The accumulator output is negated and summed at the input to the transmit DAC by an adder 356 to minimize carrier leakage.

It is important to note that for the above algorithm to operate properly (1) the local oscillators for the upconverters and downconverters in the transmit and receive paths should be derived from a common frequency reference, and (2) the DC offset in the receive ADC be accounted for and subtracted from the ADC output before processing the receive samples in the manner described above. The receive DC offset may be estimated by configuring the receiver for minimum gain, disabling the transmitter, and computing the average ADC reading over an appropriately sized block of samples.

In most WLAN applications, the transmitter and receiver operate in the same frequency band, and time-division duplexing (TDD) is used to support full-duplex communication. A complication arises in wideband implementations of WLAN systems when it is required to transmit a signal at the same time that a signal of the same or another protocol is required to be received. Since in a wideband system there is no narrowband filtering to protect the receiver in this situation, some of the energy from the transmit signal is coupled into the receive path, and imposes a limitation on the useable dynamic range of the receiver.

For example, consider the case for a multi-protocol WLAN/WPAN hub node with a simultaneous Bluetooth transmission and an 802.11 reception. Assume that the Bluetooth signal is transmitted at a +20 dBm power level from the transmit antenna, and that the return loss between the transmit and receive antenna is 20 dB. Under these conditions, the coupled transmit signal is 0 dBm at the receive antenna. If the received 802.11 signal is relatively weak, i.e., near sensitivity at 85 dBm, then a receiver dynamic range of at least 85 dB would be required to avoid saturating the receiver and reliably accommodate both the coupled Bluetooth transmit signal and received 802.11 signal. An 85 dB dynamic range requirement is difficult to achieve using modern receiver technology, and would result in an expensive ADC.

Polarization may be used as a means to reduce the transmit energy that is coupled into the receive path. WLAN communications systems typically use linear polarization, which allows for an inexpensive monopole or whip antenna implementation at both the transmitting and receiving stations. By adjusting the orientation of the receive antenna relative to the transmit antenna, the gain of each antenna in the direction of the other may be reduced causing a corresponding reduction in the transmit power that is coupled into the receive antenna.

The transmit interference canceller shown at reference numeral 400 in FIG. 6 provides an additional means for suppression. The transmit interference canceller 400 comprises a coupled signal path estimator 300, a secondary DAC 410, an upconverter 412 and a summer 414. The coupled signal path is a path between the input to the DAC (such as DAC 158) in the transmit signal path and the input to downconverter (such as downconverter 216) in the receive signal path. The coupled signal path estimator 300 receives as input the signal x(n), which is the output of the summer 164 or 262 and generates a digital signal that, at baseband, represents the transmit signal adjusted for effects caused by passing it through the coupled signal path. The signal x(n) is a complex signal. The coupled signal path estimator includes a multiplier 310, a filter 312, a non-linear distortion element 314 and an adder 316. The multiplier 310 multiplies x(n) by a function $Ae^{j\phi}$. The values of A and $\phi$ represent the (frequency non-selective) amplitude and phase effects, respectively, on the coupled transmit signal. The filter 312 filters the output signal of the multiplier 310 in accordance with a transfer function H(f) that models and reproduces frequency distortion introduced into the band of interest by the coupled signal path described above. The non-linear distortion element 314 operates on the output of the filter 312 and introduces non-linear distortion by a function D that models non-linear distortion caused by amplifiers in the receive signal and transmit signal paths. The non-linear function D maps, in a non-linear fashion, an input voltage sample to an voltage sample. Finally, the complex additive constant C models DC offset as a result of carrier feedthrough in the transmit path, and is added to the output of the element 314 by the adder 316.

The parameters A, φ, H(f), D and C are generated in a CPU (shown by block 420 in FIG. 6) using an iterative algorithm, such as a mean square algorithm, to minimize the energy of the error signal that is digitized at the ADC 116 or 220 in the receive signal path section and contained in the output signal of the ADC, that is identified as e(n). The CPU passes the updated parameters to the individual processes of the coupled signal path estimator 300 to re-shape the signal coupled to the secondary DAC 410 and the upconverter 412. The output at the adder 316 of the coupled signal path estimator 300 is a digital signal that represents, at baseband, the transmit signal coupled to the receive signal path, adjusted for phase, amplitude, frequency distortion, non-linear distortion and carrier leakage/DC offset associated with the coupled signal path identified above.

The transmit interference canceller 400 subtracts a replica of the reflected transmit signal from the receive signal path at the input to the receiver. The secondary DAC 412 and upconverter 414 convert the output of the coupled signal path estimator to an analog signal at the appropriate RF frequency, thereby synthesizing the replica signal of the reflected transrmit signal. The output of the upconverter 414 is subtracted at RF from the receive signal by the summer 414 in order to suppress the reflected transmit signal in the received signal.

In an alternative embodiment of the transmit interference canceller, the summer 414 is coupled between the downconverter 216 and the ADC 218 to subtract the analog estimate signal from the analog signal that is input to the ADC 218. The upconverter 412 is not present in this form of the transmit interference canceller.

Thus, the subtraction occurs of a replica signal at baseband, rather than at RF, and occurs before the ADC conversion, which is desirable.

A wideband system using a high-speed DAC to synthesize multiple transmit carriers is particularly sensitive to nonlinear distortion generated by the transmit PA. Left uncorrected, the mixing products generated by this type of distortion produces an unacceptably high level of out-of-band interference. Several well-known algorithms may be used to minimize this type of distortion. The simplest approach is the deployment of a highly linear PA. However, this approach is often considerably more costly in terms of price and/or current consumption. Another well-known approach used in cellular telephony is the so-called Cartesian feedback algorithm, in which a quadrature downconverter is used to monitor the output of the PA and to shape the transmit signal in order to minimize the distortion between the downconverter output and the transmitters baseband input. A disadvantage of this approach is the added cost and size of the additional receiver required to monitor the transmit path.

The PA linearization process according to the present invention does not require an additional receiver since, in the wideband system shown in FIGS. 2 and 3, the transmitter and receiver operate in the same frequency band. FIG. 6 illustrates the approach in more detail. The PA predistorter 370 comprises a predistortion look up table (LUT) and the PA linearizer 380 comprises a weighting update process performed, for example, by a CPU.

The sampled waveform x(n) from the summer following the transmit interpolators/upconverters (160 or 258) is passed through the predistortion LUT 370 which predistorts x(n) in order to compensate for nonlinear distortion generated by the PA. The output of the coupled signal path estimator 300 is added to the ADC output e(n) of the receive signal path section, in order to reconstruct the receive antenna output signal, y(n). The CPU that generates the weights periodically obtains a buffered snapshot of both x(n) and y(n), and updates the contents of the LUT in order to minimize the weighted mean-square distortion between the signals x(n) and y(n). The weighting function is used to ensure that the distortion is computed only over frequency bands in which there is an active transmission. That is, the CPU generates values for the LUT which are weighted so as to provide distortion adjustment across a spectrum only where energy associated when a transmitted signal exists. The output of the predistortion LUT is a distortion adjusted signal that is supplied to the DAC in the transmit signal path section through an adder 356 if the transmit carrier suppressor 350 is employed.

Conventional narrowband techniques typically use an agile synthesizer to convert a portion of the RF band to a desired IF frequency band on the receive signal path. An agile synthesizer is also typically used to convert a narrowband baseband signal to the desired transmit frequency. A single synthesizer may be used for systems that operate in a time-division multiple-access (TDMA) manner when the transmit and receive slots are non-overlapping in time. A single synthesizer may also be used for different communications systems that do not operate simultaneously.

The wideband radio transceiver system architecture of the present invention converts the entire frequency band from baseband to RF for transmission, and from RF to baseband for reception, without regard to the location of one or more individual channels within the RF band. This wideband approach enables a single synthesizer to be used to simultaneously support multiple channels from a single WLAN technology or multiple channels from different WLAN technologies. A wideband approach also removes the requirement for synthesizer frequency agility, which typically allows for a less expensive synthesizer implementation.

Thus, the architecture of the wideband transceiver of the present invention is suitable for receiving and transmitting information in multiple protocol standards that overlap in bandwidth at any possible instant of time. An example of such a situation is shown in FIG. 4 in which during some time interval, energy in the bandwidth of interest may be present from 802.11b, Bluetooth, and/or HomeRF carriers. Moreover, the HomeRF and Bluetooth carriers may be hopping in and out of the 802.11b band. The wideband radio architecture described herein is useful in an hub node for two-way communication with several terminal devices that operate on multiple and different protocol standards, or in a terminal device.

The present invention has been described primarily with reference to WLANs, and short-range operation in an unlicensed band, but is not limited to use in only those environments. The radio transceiver system architecture and processing techniques described herein are useful in other wireless communication networks that operate in licensed bands and over greater distances.

The above description is intended by way of example only.

What is claimed is:

1. A radio transceiver system for communication of signals occurring in multiple channels in a frequency band, the system comprising:
   a radio transceiver that downconverts energy in the frequency band including energy in the multiple channels and produces a baseband receive signal representative thereof, and that upconverts a plurality of transmit signals each to be transmitted in a corresponding one of the multiple channels in the frequency band;

an analog-to-digital converter (ADC) coupled to the radio transceiver that converts the baseband receive signal to a digital receive signal;

a digital-to-analog converter (DAC) coupled to the radio transceiver that converts digital transmit signals to analog transmit signals for upconversion by the radio transceiver; and a baseband signal processing section coupled to the ADC and to the DAC that baseband demodulates the digital receive signal to recover multiple receive data associated with corresponding channels in the frequency band and that modulates multiple transmit data to produce digital transmit signals for processing by the DAC and transmission by the radio transceiver in corresponding channels in the frequency band, wherein the baseband signal processing section performs baseband modulation according to a communication protocol for each of multiple transmit data for transmission by the radio transceiver in corresponding channels in the frequency band, and performs baseband demodulation according to the communication protocol of the digital receive signal representing receive signals for corresponding channels in the frequency band, to thereby simultaneously support multiple channels in the frequency band of the same communication protocol.

2. The system of claim 1, wherein the baseband signal processing section performs baseband modulation and baseband demodulation to simultaneously support multiple channels of the same wireless location area network (WLAN) communication protocol in the frequency band.

3. A method for communication of signals occurring in multiple channels in a frequency band, comprising:

downconverting energy in the frequency band including energy in multiple channels in which multiple signals are transmitted in accordance with the same communication protocol and producing a baseband receive signal representative thereof;

converting the baseband receive signal to a digital receive signal;

baseband demodulating the digital receive signal that represents receive signals for corresponding channels in the frequency band according to the communication protocol to recover multiple receive data, each receive data associated with a corresponding channel in the frequency band;

baseband modulating each of multiple transmit data according to the communication protocol to produce a plurality of digital transmit signals to be simultaneously transmitted in corresponding channels in the frequency band according to the same communication protocol, to thereby simultaneously support multiple channels in the frequency band of the same communication protocol;

converting the plurality of digital transmit signals to analog transmit signals for upconversion by the radio transceiver; and upconverting the plurality of analog transmit signals each to be transmitted in a corresponding one of the multiple channels in the frequency band.

4. The method of claim 3, wherein modulating comprises modulating multiple transmit data according to the same wireless local area network (WLAN) communication protocol, and demodulating comprises demodulating the digital receive signal according the WLAN communication protocol.

\* \* \* \* \*